UNITED STATES PATENT OFFICE.

HENRY LIVINGSTONE SULMAN AND HUGH FITZALIS KIRKPATRICK PICARD, OF LONDON, ENGLAND, ASSIGNORS TO MINERALS SEPARATION LIMITED, OF LONDON, ENGLAND.

RECOVERY OF COPPER FROM ITS ORES AND SOLUTIONS.

1,333,688.   Specification of Letters Patent.   Patented Mar. 16, 1920.

No Drawing.   Application filed December 27, 1913.   Serial No. 808,986.

*To all whom it may concern:*

Be it known that we, HENRY LIVINGSTONE SULMAN and HUGH FITZALIS KIRKPATRICK PICARD, subjects of the King of England, and both residing at 44 London Wall, London, England, have invented certain new and useful Improvements in the Recovery of Copper from its Ores and Solutions, of which the following is a specification.

This invention is for improvements in or relating to the recovery of copper from its ores and solutions. One of the objects of the invention is to provide an effective and economical method of precipitating copper in the form of sulfid from copper solutions obtained in any metallurgical or mining operation, and a second object of the invention is to utilize this precipitation for improving the recovery of copper from its ores by the froth-flotation process of concentration as described for example in the previous United States Patents Nos. 835,120, 962,678 and 1,064,723.

According to this invention the method of recovering copper from its solutions consists in adding a precipitant containing ferrous sulfid and calcium sulfid to the copper bearing solution, and separating the copper sulfid thus precipitated.

Previously it has been proposed to treat ores which do not contain sufficient finely divided mineral to form a coherent froth by producing freshly precipitated mineral sulfid in the pulp so as to increase the volume and coherence of the froth, as disclosed in our British Patent No. 26,019 of 1909.

According to this invention, oxidized metal values in an ore may be dissolved in any usual manner, as by a suitable solvent, and the dissolved metal precipitated and the sulfid separated by flotation.

According to this invention the recovery of copper from its ores by the froth-flotation process of concentration is improved by adding to the ore pulp a proportion of the copper sulfid precipitated by the method above referred to whereby the freshly precipitated copper sulfid increases the coherence of the froth. Or alternatively, (where the pulp contains copper in solution) the requisite proportion of the precipitant above referred to may be added to the pulp so as to precipitate copper sulfid which during the froth-flotation process performs the desired function of improving the froth recovery.

The precipitant preferably employed contains ferrous sulfid and calcium sulfid, and is preferably prepared and employed as hereinafter described.

It is known that ferrous sulfid (FeS) will precipitate copper from its solutions ($CuSO_4 + FeS = CuS + FeSO_4$) the iron replacing the copper in solution. Pyrites ($FeS_2$) does not act as an efficient precipitant, but on heating this compound in such a manner as to eliminate some sulfur, iron sesqui-sulfids and iron monosulfid are formed, but the conversion of pyrites into the monosulfid or ferrous sulfid (FeS) is difficult to obtain with completeness.

We have found that by heating pyrites (either simple $FeS_2$ or copper pyrites such as chalcopyrite or bornite) with an equivalent of lime to a low red heat and cooling out of contact with air, a much more powerful and efficient precipitant for copper solutions is formed. This precipitant contains both ferrous sulfid and calcium sulfid. This material when powdered and stirred with copper bearing solutions separates the copper as sulfid which in a short time falls as a precipitate, and may be collected from the liquors by any suitable means. In some cases the application of heat may be useful in facilitating and accelerating the separation of the copper sulfid.

The reaction on heating pyrites and lime may be represented by the equation:

$$4FeS_2 + 4CaO = 4FeS + 3CaS + CaSO_4$$

and the precipitation reaction as

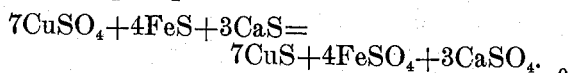

$$7CuSO_4 + 4FeS + 3CaS = 7CuS + 4FeSO_4 + 3CaSO_4.$$

Or pyritic copper concentrates may be similarly heated with lime and the resulting material used for copper precipitation.

According to a modified method, the pyrites or copper pyrites (or material containing one of these) and lime are mixed with carbon in quantity equivalent to the oxygen present in the other ingredients of the charge and this mixture is heated so as to produce ferrous sulfid and calcium sulfid according to the following equation for example:

$$FeS_2 + CaO + C = FeS + CaS + CO$$

and by this means all the sulfur originally present is put into a condition wherein it may be utilized for the precipitation of soluble copper as copper sulfid.

The carbon employed may be finely pulverized coal, charcoal, soot, lamp-black, flour or any suitable form of carbonaceous material. The mixture of lime, pyrites and carbon may advantageously be balled or briqueted with a small proportion of wood tar or other tar, or thick oil or other suitable carbonaceous binding medium, before heating.

We find that the precipitation of copper sulfid from copper-bearing solutions such as copper sulfate by this precipitant proceeds best in slightly acidified solutions.

The method of operation may consist in stirring in to the requisite quantity of solution the equivalent of powdered precipitant, allowing a sufficient time for the copper precipitate to form and subside. It is evident that this may be effected in continuously acting apparatus or plant. If the powdered precipitant be duly quantified by means of an automatic feed and if known types of settlement apparatus or separation apparatus be subsequently used, the treatment of copper liquors for the recovery of copper as sulfid becomes automatic and continuous.

Or if desired the copper-bearing liquors may be percolated through an excess of the granular precipitant in suitable vessels, the contents of which when fully charged with precipitated copper sulfid may be washed clean therefrom, or smelted direct, or the contained copper recovered by any other suitable means. We, however, prefer the direct precipitation method before described which is more economical and more easily applied than the method of precipitation of copper solution by scrap-iron ("cementation") now generally employed.

It is to be noted that the calcium sulfid in the precipitant is effective for precipitating the copper sulfid and therefore by the addition of lime to the pyrites before heating it becomes nearly twice as efficient as a precipitant as pyrites heated without lime.

The method of applying the above in improving the recovery of copper from its ores by the froth-flotation process of concentration depends on the condition under which the concentration is carried out. Various well known methods may be employed for dissolving metal values in an ore, such, for example, as the use of a suitable solvent for oxidized metal values. If the ore pulp contains or has produced in it dissolved copper, and if the precipitation of the copper sulfid by the above means should not interfere in any way with the effective operation of the froth-flotation process, the precipitant may be added direct to the ore pulp which is to undergo the concentrating process: and if the concentrate contains pyrites, the precipitant may be produced as above described from a portion of the concentrate. If on the other hand it is undesirable to effect the precipitation of the copper sulfid in the froth-flotation plan, the freshly precipitated copper sulfid may be separately produced as above described and introduced into the agitation-apparatus together with the pulp and the necessary frothing agents, acid or the like, so that the copper sulfid becomes incorporated in the froth and improves its volume or coherence.

We find that the precipitation of copper from solutions according to the methods referred to above is influenced both by the concentration of the copper solution and by the free acidity (i. e. the presence of sulfuric acid in excess of that required to neutralize the alkalinity due to calcium sulfid or other calcium compounds in the precipitant mixture).

The presence of free acid appears to be essential to the reaction between ferrous sulfid FeS and copper sulfate $CuSO_4$ (at least if the copper solution be strong i. e. if it contains more than 0.2 or 0.4 per cent. of copper).

With strong solutions, the straight equation $$FeS + CuSO_4 = CuS + FeSO_4$$

does not seem to occur effectively without acidity, but the reaction $$FeS + CuSO_4 + YH_2SO_4 = CuS + FeSO_4 + YH_2SO_4$$

does take place effectively where Y (the amount of sulfuric acid) may be an equivalent or less or more. We find that according to the magnitude of Y an inverse time factor occurs. When Y is large the time required for precipitation diminishes, when Y is small the time required increases. In cases where Y is small, metallic copper makes its appearance temporarily in the precipitate and at this stage some ferric salt is found in solution and the precipitation of copper is incomplete, but on standing, a fresh equilibrium ensues, all the copper being precipitated as copper sulfid CuS, while only ferrous sulfate and sulfuric acid remain in solution.

The following example illustrates the effect of acidity: With a solution of copper sulfate containing 1.525 per cent. copper in solution and using the theoretical quantity of calcium sulfid and ferrous sulfid precipitant made from copper pyrite as above described, when 1 per cent. of sulfuric acid was present (less than an equivalent) the time required for complete precipitation of all the copper was two hours, no ferric iron remaining in solution. Some metallic copper made its appearance in the first stages of this precipitation.

When 3 per cent. of sulfuric acid was present (which is more than an equivalent) the precipitation was complete in one hour, no metallic copper being produced.

With 5 per cent. of sulfuric acid, the precipitation was complete in half an hour, also without temporary precipitation of copper.

The above remarks as to the necessity for a high degree of acidity apply to copper sulfate solutions containing more than 0.2 per cent. of copper and more especially to those containing more than 0.4 per cent. of copper.

In precipitating strong solutions the agitation should be only that required to keep the mass slowly mixed, as oxidation by air must be avoided.

The method of preparing the precipitant above described and the precipitant above described are not claimed herein, being the subject-matter of Patent No. 1,178,191, issued to us April 4, 1916, on an application filed as a division of this application.

What we claim as our invention and desire to secure by Letters Patent is:—

1. A method of recovering copper from its solutions which consists in adding a precipitant containing ferrous sulfid and calcium sulfid to the copper bearing solution and separating the copper sulfid precipitated.

2. A method of recovering copper from its solutions which consists in acidifying the solution, adding a precipitant containing ferrous sulfid and calcium sulfid to the acidified copper bearing solution and separating the copper sulfid precipitated.

3. A method of improving the recovery of copper from its ores by the froth-flotation process of concentration which consists in adding to the pulp a precipitant containing ferrous sulfid and calcium sulfid in quantity sufficient to precipitate any copper in solution and thereafter floating the copper in the pulp and the copper precipitated by the froth-flotation process of concentration.

4. A method of improving the recovery of copper from its ores by the froth-flotation process of concentration which consists in adding to the pulp a precipitant containing ferrous sulfid and calcium sulfid in quantity sufficient to precipitate any copper in solution, acidifying the solution and thereafter floating the copper in the pulp and the copper precipitated by the froth-flotation process of concentration.

5. A method of improving the recovery of copper from its ores by the froth-flotation process of concentration which consists in adding to the pulp a precipitant containing ferrous sulfid and calcium sulfid in quantity sufficient to precipitate any copper in solution, and thereafter floating the copper in the pulp and the copper precipitated by the froth-flotation process of concentration.

6. A method of improving the recovery of copper from its ores by the froth-flotation process of concentration which consists in adding to the pulp a precipitant containing ferrous sulfid and calcium sulfid in quantity sufficient to precipitate any copper in solution, acidifying the pulp and thereafter floating the copper in the pulp and the copper precipitated by the froth-flotation process of concentration.

In testimony whereof we have signed our names to this specification in the presence of two subscribing witnesses.

HENRY LIVINGSTONE SULMAN.
HUGH FITZALIS KIRKPATRICK PICARD.

Witnesses:
HAROLD CHARLES HAWKINS,
WILLIAM JAMES WALBON.